(12) United States Patent
Meyer et al.

(10) Patent No.: US 7,120,743 B2
(45) Date of Patent: Oct. 10, 2006

(54) ARBITRATION SYSTEM AND METHOD FOR MEMORY RESPONSES IN A HUB-BASED MEMORY SYSTEM

(75) Inventors: James W. Meyer, Shoreview, MN (US); Cory Kanski, Blaine, MN (US)

(73) Assignee: Micron Technology, Inc., Boise, ID (US)

( * ) Notice: Subject to any disclaimer, the term of this patent is extended or adjusted under 35 U.S.C. 154(b) by 261 days.

(21) Appl. No.: 10/690,810

(22) Filed: Oct. 20, 2003

(65) Prior Publication Data

US 2005/0086441 A1    Apr. 21, 2005

(51) Int. Cl.
*G06F 12/00* (2006.01)
(52) U.S. Cl. ............... 711/118; 711/158; 710/52
(58) Field of Classification Search .................. None
See application file for complete search history.

(56) References Cited

U.S. PATENT DOCUMENTS

| | | | | |
|---|---|---|---|---|
| 3,742,253 | A | 6/1973 | Kronies | 307/247 |
| 4,045,781 | A | 8/1977 | Levy et al. | 364/200 |
| 4,240,143 | A | 12/1980 | Besemer et al. | 364/200 |
| 4,245,306 | A | 1/1981 | Besemer et al. | 364/200 |
| 4,253,144 | A | 2/1981 | Bellamy et al. | 364/200 |
| 4,253,146 | A | 2/1981 | Bellamy et al. | 364/200 |
| 4,608,702 | A | 8/1986 | Hirzel et al. | 375/110 |
| 4,707,823 | A | 11/1987 | Holdren et al. | 370/1 |
| 4,724,520 | A | 2/1988 | Athanas et al. | 364/200 |
| 4,831,520 | A | 5/1989 | Rubinfeld et al. | 364/200 |
| 4,891,808 | A | 1/1990 | Williams | 370/112 |
| 4,930,128 | A | 5/1990 | Suzuki et al. | 371/12 |
| 4,953,930 | A | 9/1990 | Ramsey et al. | 350/96.11 |
| 5,241,506 | A | 8/1993 | Motegi et al. | 365/210 |
| 5,243,703 | A | 9/1993 | Farmwald et al. | 395/325 |
| 5,251,303 | A | 10/1993 | Fogg, Jr. et al. | 395/275 |
| 5,269,022 | A | 12/1993 | Shinjo et al. | 395/700 |
| 5,313,590 | A | 5/1994 | Taylor | 395/325 |
| 5,317,752 | A | 5/1994 | Jewett et al. | 395/750 |
| 5,319,755 | A | 6/1994 | Farmwald et al. | 395/325 |
| 5,327,553 | A | 7/1994 | Jewett et al. | 395/575 |
| 5,355,391 | A | 10/1994 | Horowitz et al. | 375/36 |
| 5,432,823 | A | 7/1995 | Gasbarro et al. | 375/356 |
| 5,432,907 | A | 7/1995 | Picazo, Jr. et al. | 395/200 |
| 5,442,770 | A | 8/1995 | Barratt | 395/403 |

(Continued)

FOREIGN PATENT DOCUMENTS

EP    0849685 A2    6/1998

(Continued)

OTHER PUBLICATIONS

Intel, "Intel 840 Chipset: 82840 Memory Controller Hub (MCH)", Datasheet, Oct. 1999, pp. 1-178.

(Continued)

*Primary Examiner*—Mano Padmanabhan
*Assistant Examiner*—Craig E Walter
(74) *Attorney, Agent, or Firm*—Dorsey & Whitney LLP

(57) ABSTRACT

A memory hub includes a local queue that stores local memory responses, a bypass path that passes downstream memory responses, and a buffered queue coupled to the bypass path that stores downstream memory responses from the bypass path. A multiplexer is coupled to the local queue, buffered queue, and the bypass path and outputs responses from a selected one of the queues or the bypass path responsive to a control signal. Arbitration control logic is coupled to the multiplexer and the queues and develops the control signal to control the response output by the multiplexer.

29 Claims, 3 Drawing Sheets

U.S. PATENT DOCUMENTS

| | | | |
|---|---|---|---|
| 5,461,627 A | 10/1995 | Rypinski | 370/95.2 |
| 5,465,229 A | 11/1995 | Bechtolsheim et al. | 345/477 |
| 5,479,370 A | 12/1995 | Furuyama et al. | 365/189.12 |
| 5,497,476 A | 3/1996 | Oldfield et al. | 395/439 |
| 5,502,621 A | 3/1996 | Schumacher et al. | 361/760 |
| 5,544,319 A | 8/1996 | Acton et al. | 395/200.07 |
| 5,566,325 A | 10/1996 | Bruce, II et al. | 395/494 |
| 5,577,220 A | 11/1996 | Combs et al. | 395/416 |
| 5,581,767 A | 12/1996 | Katsuki et al. | 395/800 |
| 5,606,717 A | 2/1997 | Farmwald et al. | 395/856 |
| 5,638,334 A | 6/1997 | Farmwald et al. | 365/230.03 |
| 5,638,534 A | 6/1997 | Mote, Jr. | 395/485 |
| 5,659,798 A | 8/1997 | Blumrich et al. | 395/846 |
| 5,687,325 A | 11/1997 | Chang | 395/284 |
| 5,706,224 A | 1/1998 | Srinivasan et al. | 365/49 |
| 5,710,733 A | 1/1998 | Chengson et al. | 365/52 |
| 5,715,456 A | 2/1998 | Bennett et al. | 395/652 |
| 5,729,709 A | 3/1998 | Harness | 395/405 |
| 5,748,616 A | 5/1998 | Riley | 370/242 |
| 5,796,413 A | 8/1998 | Shipp et al. | 345/522 |
| 5,818,844 A | 10/1998 | Singh et al. | 370/463 |
| 5,819,304 A | 10/1998 | Nilsen et al. | 711/5 |
| 5,822,255 A | 10/1998 | Uchida | 365/194 |
| 5,832,250 A | 11/1998 | Whittaker | 395/471 |
| 5,875,352 A | 2/1999 | Gentry et al. | 395/843 |
| 5,875,454 A | 2/1999 | Craft et al. | 711/113 |
| 5,887,159 A | 3/1999 | Burrows | 395/567 |
| 5,889,714 A | 3/1999 | Schumann et al. | 365/203 |
| 5,928,343 A | 7/1999 | Farmwald et al. | 710/104 |
| 5,963,942 A | 10/1999 | Igata | 707/6 |
| 5,966,724 A | 10/1999 | Ryan | 711/105 |
| 5,973,935 A | 10/1999 | Schoenfeld et al. | 361/813 |
| 5,973,951 A | 10/1999 | Bechtolsheim et al. | 365/52 |
| 5,978,567 A | 11/1999 | Rebane et al. | 395/200.49 |
| 5,987,196 A | 11/1999 | Noble | 385/14 |
| 6,011,741 A | 1/2000 | Wallace et al. | 365/221 |
| 6,023,726 A | 2/2000 | Saksena | 709/219 |
| 6,029,250 A | 2/2000 | Keeth | 713/400 |
| 6,031,241 A | 2/2000 | Silfvast et al. | 250/504 R |
| 6,033,951 A | 3/2000 | Chao | 438/253 |
| 6,038,630 A | 3/2000 | Foster et al. | 710/132 |
| 6,061,263 A | 5/2000 | Boaz et al. | 365/51 |
| 6,061,296 A | 5/2000 | Ternullo, Jr. et al. | 365/233 |
| 6,067,262 A | 5/2000 | Irrinki et al. | 365/201 |
| 6,067,649 A | 5/2000 | Goodwin | 714/718 |
| 6,073,190 A | 6/2000 | Rooney | 710/56 |
| 6,076,139 A | 6/2000 | Welker et al. | 711/104 |
| 6,079,008 A | 6/2000 | Clery, III | 712/11 |
| 6,092,158 A | 7/2000 | Harriman et al. | 711/151 |
| 6,098,158 A | 8/2000 | Lay et al. | 711/162 |
| 6,105,075 A | 8/2000 | Ghaffari | 710/5 |
| 6,111,757 A | 8/2000 | Dell et al. | 361/737 |
| 6,125,431 A | 9/2000 | Kobayashi | 711/154 |
| 6,128,703 A | 10/2000 | Bourekas et al. | 711/138 |
| 6,131,149 A | 10/2000 | Lu et al. | 711/167 |
| 6,134,624 A | 10/2000 | Burns et al. | 710/131 |
| 6,137,709 A | 10/2000 | Boaz et al. | 365/51 |
| 6,144,587 A | 11/2000 | Yoshida | 365/189.05 |
| 6,167,465 A | 12/2000 | Parvin et al. | 710/22 |
| 6,167,486 A | 12/2000 | Lee et al. | 711/120 |
| 6,175,571 B1 | 1/2001 | Haddock et al. | 370/423 |
| 6,185,352 B1 | 2/2001 | Hurley | 385/114 |
| 6,185,676 B1 | 2/2001 | Poplingher et al. | 712/239 |
| 6,186,400 B1 | 2/2001 | Dvorkis et al. | 235/462.45 |
| 6,191,663 B1 | 2/2001 | Hannah | 333/17.3 |
| 6,201,724 B1 | 3/2001 | Ishizaki et al. | 365/49 |
| 6,208,180 B1 | 3/2001 | Fisch et al. | 327/141 |
| 6,219,725 B1 | 4/2001 | Diehl et al. | 710/26 |
| 6,223,301 B1 | 4/2001 | Santeler et al. | 714/6 |
| 6,233,376 B1 | 5/2001 | Updegrove | 385/14 |
| 6,243,769 B1 | 6/2001 | Rooney | 710/56 |
| 6,243,831 B1 | 6/2001 | Mustafa et al. | 714/24 |
| 6,246,618 B1 | 6/2001 | Yamamoto et al. | 365/200 |
| 6,247,107 B1 | 6/2001 | Christie | 711/216 |
| 6,249,802 B1 | 6/2001 | Richardson et al. | 709/200 |
| 6,256,692 B1 | 7/2001 | Yoda et al. | 710/104 |
| 6,266,730 B1 | 7/2001 | Perino et al. | 710/126 |
| 6,272,609 B1 | 8/2001 | Jeddeloh | 711/169 |
| 6,285,349 B1 | 9/2001 | Smith | 345/147 |
| 6,286,083 B1 | 9/2001 | Chin et al. | 711/151 |
| 6,294,937 B1 | 9/2001 | Crafts et al. | 327/158 |
| 6,301,637 B1 | 10/2001 | Krull et al. | 711/112 |
| 6,324,485 B1 | 11/2001 | Ellis | 702/117 |
| 6,327,642 B1 | 12/2001 | Lee et al. | 711/120 |
| 6,330,205 B1 | 12/2001 | Shimizu et al. | 365/230.06 |
| 6,347,055 B1 | 2/2002 | Motomura | 365/189.05 |
| 6,349,363 B1 | 2/2002 | Cai et al. | 711/129 |
| 6,356,573 B1 | 3/2002 | Jonsson et al. | 372/46 |
| 6,367,074 B1 | 4/2002 | Bates et al. | 717/11 |
| 6,370,068 B1 | 4/2002 | Rhee | 365/196 |
| 6,370,611 B1 | 4/2002 | Callison et al. | 711/105 |
| 6,373,777 B1 | 4/2002 | Suzuki | 365/230.03 |
| 6,381,190 B1 | 4/2002 | Shinkai | 365/230.03 |
| 6,389,514 B1 | 5/2002 | Rokicki | 711/136 |
| 6,392,653 B1 | 5/2002 | Malandain et al. | 345/501 |
| 6,401,149 B1 | 6/2002 | Dennin et al. | 710/58 |
| 6,401,213 B1 | 6/2002 | Jeddeloh | 713/401 |
| 6,405,280 B1 | 6/2002 | Ryan | 711/105 |
| 6,421,744 B1 | 7/2002 | Morrison et al. | 710/22 |
| 6,430,696 B1 | 8/2002 | Keeth | 713/503 |
| 6,433,785 B1 | 8/2002 | Garcia et al. | 345/531 |
| 6,434,639 B1 | 8/2002 | Haghighi | 710/39 |
| 6,434,696 B1 | 8/2002 | Kang | 713/2 |
| 6,434,736 B1 | 8/2002 | Schaecher et al. | 716/17 |
| 6,438,622 B1 | 8/2002 | Haghighi et al. | 710/1 |
| 6,438,668 B1 | 8/2002 | Esfahani et al. | 711/165 |
| 6,449,308 B1 | 9/2002 | Knight, Jr. et al. | 375/212 |
| 6,453,393 B1 | 9/2002 | Holman et al. | 711/154 |
| 6,457,116 B1 | 9/2002 | Mirsky et al. | 712/16 |
| 6,460,114 B1 | 10/2002 | Jeddeloh | 711/120 |
| 6,462,978 B1 | 10/2002 | Shibata et al. | 365/63 |
| 6,463,059 B1 | 10/2002 | Movshovich et al. | 370/389 |
| 6,470,422 B1 | 10/2002 | Cai et al. | 711/129 |
| 6,473,828 B1 | 10/2002 | Matsui | 711/104 |
| 6,477,592 B1 | 11/2002 | Chen et al. | 710/52 |
| 6,477,614 B1 | 11/2002 | Leddige et al. | 711/5 |
| 6,477,621 B1 | 11/2002 | Lee et al. | 711/120 |
| 6,479,322 B1 | 11/2002 | Kawata et al. | 438/109 |
| 6,487,556 B1 | 11/2002 | Downs et al. | 707/101 |
| 6,490,188 B1 | 12/2002 | Nuxoll et al. | 365/63 |
| 6,493,803 B1 | 12/2002 | Pham et al. | 711/147 |
| 6,496,193 B1 | 12/2002 | Surti et al. | 345/552 |
| 6,496,909 B1 | 12/2002 | Schimmel | 711/163 |
| 6,501,471 B1 | 12/2002 | Venkataraman et al. | 345/424 |
| 6,505,287 B1 | 1/2003 | Uematsu | 711/170 |
| 6,523,092 B1 | 2/2003 | Fanning | 711/134 |
| 6,523,093 B1 * | 2/2003 | Bogin et al. | 711/137 |
| 6,526,483 B1 | 2/2003 | Cho et al. | 711/154 |
| 6,526,498 B1 | 2/2003 | Mirsky et al. | 712/11 |
| 6,539,490 B1 | 3/2003 | Forbes et al. | 713/401 |
| 6,552,564 B1 | 4/2003 | Forbes et al. | 326/30 |
| 6,553,479 B1 | 4/2003 | Mirsky et al. | 712/16 |
| 6,564,329 B1 | 5/2003 | Cheung et al. | 713/322 |
| 6,587,912 B1 | 7/2003 | Leddige et al. | 711/5 |
| 6,590,816 B1 | 7/2003 | Perner | 365/200 |
| 6,594,713 B1 | 7/2003 | Fuoco et al. | 710/31 |
| 6,594,722 B1 | 7/2003 | Willke, II et al. | 710/313 |
| 6,598,154 B1 | 7/2003 | Vaid et al. | 712/237 |
| 6,615,325 B1 | 9/2003 | Mailloux et al. | 711/154 |
| 6,622,227 B1 | 9/2003 | Zumkehr et al. | 711/167 |
| 6,628,294 B1 | 9/2003 | Sadowsky et al. | 345/568 |
| 6,629,220 B1 | 9/2003 | Dyer | 711/158 |
| 6,631,440 B1 | 10/2003 | Jenne et al. | 711/105 |
| 6,636,110 B1 | 10/2003 | Ooishi et al. | 327/565 |

| | | | |
|---|---|---|---|
| 6,636,912 B1 | 10/2003 | Ajanovic et al. | 710/105 |
| 6,646,929 B1 | 11/2003 | Moss et al. | 365/194 |
| 6,647,470 B1 | 11/2003 | Janzen | 711/154 |
| 6,658,509 B1 | 12/2003 | Bonella et al. | 710/100 |
| 6,662,304 B1 | 12/2003 | Keeth et al. | 713/400 |
| 6,665,202 B1 | 12/2003 | Lindahl et al. | 365/49 |
| 6,667,895 B1 | 12/2003 | Jang et al. | 365/63 |
| 6,681,292 B1 | 1/2004 | Creta et al. | 711/119 |
| 6,697,926 B1 | 2/2004 | Johnson et al. | 711/167 |
| 6,715,018 B1 | 3/2004 | Farnworth et al. | 710/300 |
| 6,718,440 B1 | 4/2004 | Maiyuran et al. | 711/137 |
| 6,721,195 B1 | 4/2004 | Brunelle et al. | 365/63 |
| 6,724,685 B1 | 4/2004 | Braun et al. | 365/233 |
| 6,728,800 B1 | 4/2004 | Lee et al. | 710/54 |
| 6,735,679 B1 | 5/2004 | Herbst et al. | 711/167 |
| 6,735,682 B1 | 5/2004 | Segelken et al. | 711/220 |
| 6,745,275 B1 | 6/2004 | Chang | 710/305 |
| 6,751,113 B1 | 6/2004 | Bhakta et al. | 365/63 |
| 6,751,703 B1 | 6/2004 | Chilton | 711/113 |
| 6,751,722 B1 | 6/2004 | Mirsky et al. | 712/15 |
| 6,754,117 B1 | 6/2004 | Jeddeloh | 365/201 |
| 6,754,812 B1 | 6/2004 | Abdallah et al. | 712/234 |
| 6,756,661 B1 | 6/2004 | Tsuneda et al. | 257/673 |
| 6,760,833 B1 | 7/2004 | Dowling | 712/34 |
| 6,771,538 B1 | 8/2004 | Shukuri et al. | 365/185.05 |
| 6,775,747 B1 | 8/2004 | Venkatraman | 711/137 |
| 6,782,435 B1 | 8/2004 | Garcia et al. | 710/33 |
| 6,785,780 B1 | 8/2004 | Klein et al. | 711/148 |
| 6,789,173 B1 | 9/2004 | Tanaka et al. | 711/147 |
| 6,792,059 B1 | 9/2004 | Yuan et al. | 375/354 |
| 6,792,496 B1 | 9/2004 | Aboulenein et al. | 710/306 |
| 6,795,899 B1 | 9/2004 | Dodd et al. | 711/137 |
| 6,799,246 B1 | 9/2004 | Wise et al. | 711/117 |
| 6,799,268 B1 | 9/2004 | Boggs et al. | 712/228 |
| 6,804,760 B1 | 10/2004 | Wiliams | 711/170 |
| 6,804,764 B1 | 10/2004 | LaBerge et al. | 711/170 |
| 6,807,630 B1 | 10/2004 | Lay et al. | 713/2 |
| 6,811,320 B1 | 11/2004 | Abbott | 385/58 |
| 6,816,947 B1 | 11/2004 | Huffman | 711/151 |
| 6,820,181 B1 | 11/2004 | Jeddeloh et al. | 711/169 |
| 6,821,029 B1 | 11/2004 | Grung et al. | 385/92 |
| 6,823,023 B1 | 11/2004 | Hannah | 375/296 |
| 6,845,409 B1 | 1/2005 | Talagala et al. | 710/20 |
| 6,889,304 B1 | 5/2005 | Perego et al. | 711/170 |
| 6,901,494 B1 | 5/2005 | Zumkehr et al. | 711/167 |
| 6,904,556 B1* | 6/2005 | Walton et al. | 714/766 |
| 6,910,109 B1 | 6/2005 | Holman et al. | 711/156 |
| 6,912,612 B1 | 6/2005 | Kapur et al. | 710/309 |
| 6,947,672 B1* | 9/2005 | Jiang et al. | 398/135 |
| 2001/0039612 A1 | 11/2001 | Lee | 713/2 |
| 2002/0112119 A1 | 8/2002 | Halbert et al. | 711/115 |
| 2002/0116588 A1 | 8/2002 | Beckert et al. | 711/161 |
| 2002/0144064 A1 | 10/2002 | Fanning | 711/144 |
| 2002/0178319 A1 | 11/2002 | Sanchez-Olea | 710/305 |
| 2003/0005223 A1 | 1/2003 | Coulson et al. | 711/118 |
| 2003/0005344 A1 | 1/2003 | Bhamidipati et al. | 713/400 |
| 2003/0043158 A1 | 3/2003 | Wasserman et al. | 345/545 |
| 2003/0043426 A1 | 3/2003 | Baker et al. | 359/109 |
| 2003/0093630 A1 | 5/2003 | Richard et al. | 711/154 |
| 2003/0095559 A1 | 5/2003 | Sano et al. | 370/419 |
| 2003/0149809 A1 | 8/2003 | Jensen et al. | 710/22 |
| 2003/0156581 A1 | 8/2003 | Osborne | 370/389 |
| 2003/0163649 A1* | 8/2003 | Kapur et al. | 711/146 |
| 2003/0177320 A1 | 9/2003 | Sah et al. | 711/158 |
| 2003/0193927 A1 | 10/2003 | Hronik | 370/351 |
| 2003/0217223 A1 | 11/2003 | Nino, Jr. et al. | 711/105 |
| 2003/0227798 A1 | 12/2003 | Pax | 365/189.12 |
| 2003/0229762 A1 | 12/2003 | Maiyuran et al. | 711/137 |
| 2003/0229770 A1 | 12/2003 | Jeddeloh | 711/213 |
| 2004/0022094 A1* | 2/2004 | Radhakrishnan et al. | 365/200 |
| 2004/0044833 A1 | 3/2004 | Ryan | 711/5 |
| 2004/0064602 A1 | 4/2004 | George | 710/22 |
| 2004/0126115 A1 | 7/2004 | Levy et al. | 398/116 |
| 2004/0128449 A1* | 7/2004 | Osborne et al. | 711/137 |
| 2004/0144994 A1 | 7/2004 | Lee et al. | 257/200 |
| 2004/0236885 A1 | 11/2004 | Fredriksson et al. | 710/100 |
| 2005/0015426 A1 | 1/2005 | Woodruff et al. | 709/200 |
| 2005/0044327 A1 | 2/2005 | Howard et al. | 711/147 |
| 2005/0071542 A1 | 3/2005 | Weber et al. | 711/105 |
| 2005/0105350 A1 | 5/2005 | Zimmerman | 365/201 |
| 2005/0149603 A1 | 7/2005 | DeSota et al. | 709/200 |
| 2005/0166006 A1* | 7/2005 | Talbot et al. | 711/105 |

FOREIGN PATENT DOCUMENTS

| | | |
|---|---|---|
| JP | 2001265539 A | 9/2001 |
| WO | WO 93/19422 | 9/1993 |
| WO | WO 98/57489 | 12/1998 |
| WO | WO 02/27499 A2 | 4/2002 |

OTHER PUBLICATIONS

"Free On-Line Dictionary of Computing" entry Flash Eraseable Programmable Read-Only Memory, online May 17, 2004 [http://foldoc.doc.ic.ac.uk/foldoc/foldoc.cgi?flash+memory].

Micron Technology, Inc., Synchronous DRAM Module 512MB/1GB (x72, ECC) 168-PIN Registered FBGA SDRAM DIMM, Micron Technology, Inc., 2002, pp. 1-23.

Intel, "Flash Memory PCI Add-In Card for Embedded Systems", Application Note AP-758, Sep. 1997, pp. i-13.

Shanley, T. et al., "PCI System Architecture", Third Edition, Mindshare, Inc., 1995, pp. 24-25.

Rambus, Inc., "Direct Rambus™ Technology Disclosure", Oct. 1997. pp. 1-16.

* cited by examiner

ARBITRATION SYSTEM AND METHOD FOR MEMORY RESPONSES IN A HUB-BASED MEMORY SYSTEM

TECHNICAL FIELD

This invention relates to computer systems, and, more particularly, to a computer system including a system memory having a memory hub architecture.

BACKGROUND OF THE INVENTION

Computer systems use memory devices, such as dynamic random access memory ("DRAM") devices, to store data that are accessed by a processor. These memory devices are normally used as system memory in a computer system. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data are transferred between the system memory and the processor. The memory controller is often part of a system controller, which also includes bus bridge circuitry for coupling the processor bus to an expansion bus, such as a PCI bus.

Although the operating speed of memory devices has continuously increased, this increase in operating speed has not kept pace with increases in the operating speed of processors. Even slower has been the increase in operating speed of memory controllers coupling processors to memory devices. The relatively slow speed of memory controllers and memory devices limits the data bandwidth between the processor and the memory devices.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate, the delay in initially providing the data can significantly slow the operating speed of a computer system using such SDRAM devices.

One approach to alleviating the memory latency problem is to use multiple memory devices coupled to the processor through a memory hub. In a memory hub architecture, a memory hub controller is coupled over a high speed data link to several memory modules. Typically, the memory modules are coupled in a point-to-point or daisy chain architecture such that the memory modules are connected one to another in series. Thus, the memory hub controller is coupled to a first memory module over a first high speed data link, with the first memory module connected to a second memory module through a second high speed data link, and the second memory module coupled to a third memory module through a third high speed data link, and so on in a daisy chain fashion.

Each memory module includes a memory hub that is coupled to the corresponding high speed data links and a number of memory devices on the module, with the memory hubs efficiently routing memory requests and memory responses between the controller and the memory devices over the high speed data links. Each memory requests typically includes a memory command specifying the type of memory access (e.g., a read or a write) called for by the request, a memory address specifying a memory location that is to be accessed, and, in the case of a write memory request, write data. The memory request also normally includes information identifying the memory module that is being accessed, but this can be accomplished by mapping different addresses to different memory modules. A memory response is typically provided only for a read memory request, and typically includes read data as well as an identifying header that allows the memory hub controller to identify the memory request corresponding to the memory response. However, it should be understood that memory requests and memory responses having other characteristics may be used. In any case, in the following description, memory requests issued by the memory hub controller propagate downstream from one memory hub to another, while memory responses propagate upstream from one memory hub to another until reaching the memory hub controller. Computer systems employing this architecture can have a higher bandwidth because a processor can access one memory device while another memory device is responding to a prior memory access. For example, the processor can output write data to one of the memory devices in the system while another memory device in the system is preparing to provide read data to the processor. Moreover, this architecture also provides for easy expansion of the system memory without concern for degradation in signal quality as more memory modules are added, such as occurs in conventional multi drop bus architectures.

Although computer systems using memory hubs may provide superior performance, they nevertheless may often fail to operate at optimum speeds for a variety of reasons. For example, even though memory hubs can provide computer systems with a greater memory bandwidth, they still suffer from latency problems of the type described above. More specifically, although the processor may communicate with one memory device while another memory device is preparing to transfer data, it is sometimes necessary to receive data from one memory device before the data from another memory device can be used. In the event data must be received from one memory device before data received from another memory device can be used, the latency problem continues to slow the operating speed of such computer systems.

Another factor that can reduce the speed of memory transfers in a memory hub system is the transferring of read data upstream (i.e., back to the memory hub controller) over the high-speed links from one hub to another. Each hub must determine whether to send local responses first or to forward responses from downstream memory hubs first, and the way in which this is done affects the actual latency of a specific response, and more so, the overall latency of the system memory. This determination may be referred to as arbitration, with each hub arbitrating between local requests and upstream data transfers.

There is a need for a system and method for arbitrating data transfers in a system memory having a memory hub architecture to lower the latency of the system memory.

SUMMARY OF THE INVENTION

According to one aspect of the present invention, a memory hub includes a local queue that receives and stores local memory responses. A bypass path receives downstream memory responses and passes the downstream memory responses while a buffered queue is coupled to the bypass path and stores downstream memory responses. A multiplexer is coupled to the local queue, the bypass path, and the buffered queue, and outputs one of the responses responsive to a control signal. Arbitration control logic is coupled to the multiplexer and develops the control signal to control the source of the responses output by the multiplexer.

DETAILED DESCRIPTION OF THE INVENTION

Figure 1:
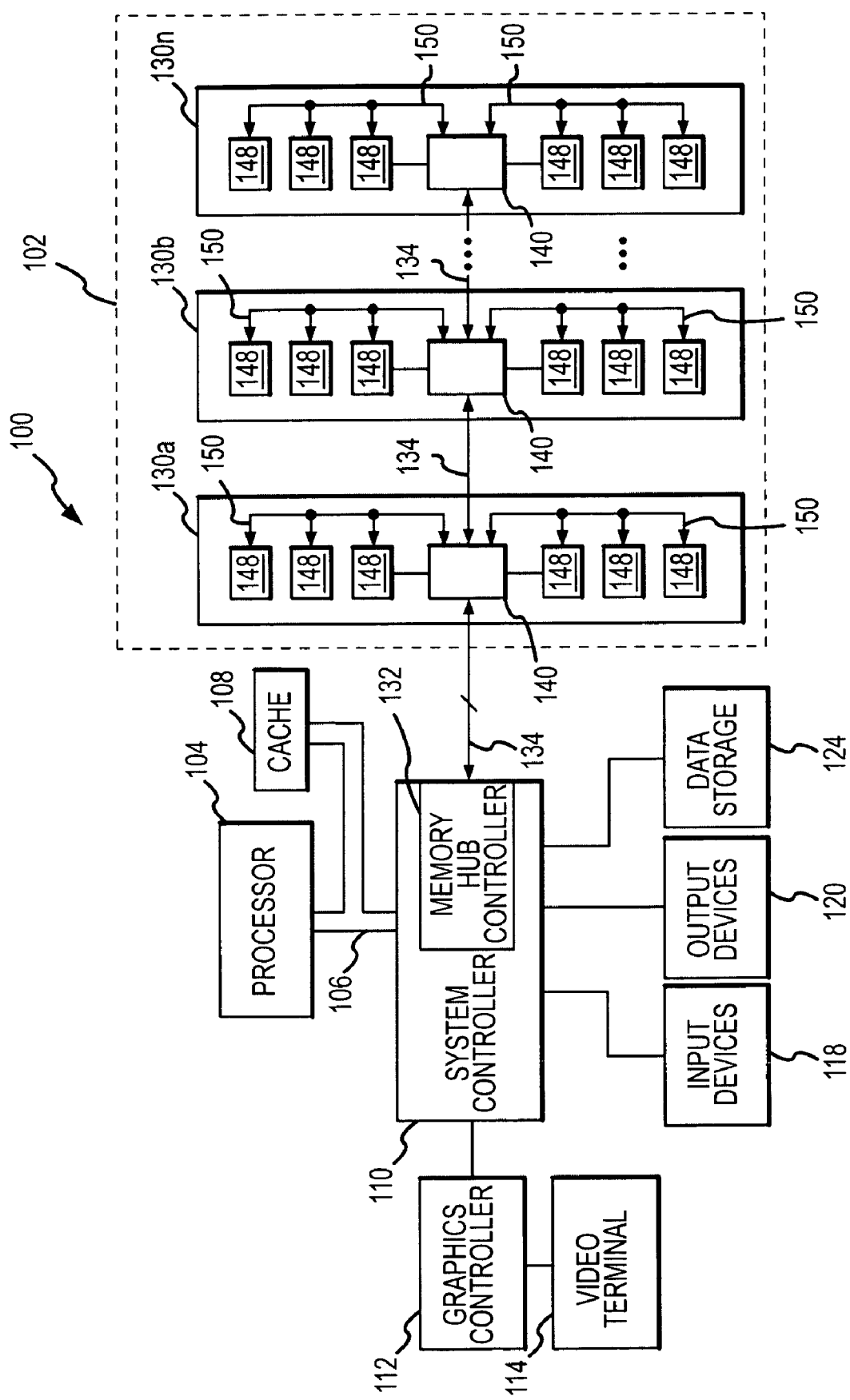
FIG. 1 is a block diagram of a computer system including a system memory having a high bandwidth memory hub architecture according to one example of the present invention.

A computer system 100 according to one example of the present invention is shown in FIG. 1. The computer system 100 includes a system memory 102 having a memory hub architecture including a plurality of memory modules 130, each memory module including a corresponding memory hub 140. Each of the memory hubs 140 arbitrates between memory responses from the memory module 130 on which the hub is contained and memory responses from downstream memory modules, and in this way the memory hubs effectively control the latency of respective memory modules in the system memory by controlling how quickly responses are returned to a system controller 110, as will be described in more detail below. In the following description, certain details are set forth to provide a sufficient understanding of the present invention. One skilled in the art will understand, however, that the invention may be practiced without these particular details. In other instances, well-known circuits, control signals, timing protocols, and/or software operations have not been shown in detail or omitted entirely in order to avoid unnecessarily obscuring the present invention.

The computer system 100 includes a processor 104 for performing various computing functions, such as executing specific software to perform specific calculations or tasks. The processor 104 is typically a central processing unit ("CPU") having a processor bus 106 that normally includes an address bus, a control bus, and a data bus. The processor bus 106 is typically coupled to cache memory 108, which, as previously mentioned, is usually static random access memory ("SRAM"). Finally, the processor bus 106 is coupled to the system controller 110, which is also sometimes referred to as a "North Bridge" or "memory controller."

The system controller 110 serves as a communications path to the processor 104 for the memory modules 130 and for a variety of other components. More specifically, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 also includes a memory hub controller ("MHC") 132 that is coupled to the system memory 102 including the memory modules 130a, b . . . n, and operates to apply commands to control and access data in the memory modules. The memory modules 130 are coupled in a point-to-point or daisy chain architecture through respective high speed links 134 coupled between the modules and the memory hub controller 132. The high-speed links 134 may be optical, RF, or electrical communications paths, or may be some other suitable type of communications paths, as will be appreciated by those skilled in the art. In the event the high-speed links 134 are implemented as optical communications paths, each optical communication path may be in the form of one or more optical fibers, for example. In such a system, the memory hub controller 132 and the memory modules 130 will each include an optical input/output port or separate input and output ports coupled to the corresponding optical communications paths. Although the memory modules 130 are shown coupled to the memory hub controller 132 in a daisy architecture, other topologies that may be used, such as a ring topology, will be apparent to those skilled in the art.

Each of the memory modules 130 includes the memory hub 140 for communicating over the corresponding high-speed links 134 and for controlling access to six memory devices 148, which are synchronous dynamic random access memory ("SDRAM") devices in the example of FIG. 1. The memory hubs 140 each include input and output ports that are coupled to the corresponding high-speed links 134, with the nature and number of ports depending on the characteristics of the high-speed links. A fewer or greater number of memory devices 148 may be used, and memory devices other than SDRAM devices may also be used. The memory hub 140 is coupled to each of the system memory devices 148 through a bus system 150, which normally includes a control bus, an address bus, and a data bus.

As previously mentioned, each of the memory hubs 140 executes an arbitration process that controls the way in which memory responses associated with the memory module 130 containing that hub and memory responses from downstream memory modules are returned to the memory hub controller 132. In the following description, upstream memory responses associated with the particular memory hub 140 and the corresponding memory module 130 will be referred to as "local" upstream memory responses or simply "local responses," while upstream memory responses from downstream memory modules will be referred to as downstream memory responses or simply "downstream responses." In operation, each memory hub 140 executes a desired arbitration process to control the way in which local and downstream responses are returned to the memory hub controller 132. For example, each hub 140 may give priority to downstream responses and thereby forward such downstream responses upstream prior to local responses that need to be sent upstream. Conversely, each memory hub 140 may give priority to local responses and thereby forward such local responses upstream prior to downstream responses that need to be sent upstream. Examples of arbitration processes that may be executed by the memory hubs 140 will be described in more detail below.

Each memory hub 140 may execute a different arbitration process or all the hubs may execute the same process, with this determination depending on the desired characteristics of the system memory 102. It should be noted that the arbitration process executed by each memory hub 140 is only applied when a conflict exists between local and downstream memory responses. Thus, each memory hub 140 need only execute the corresponding arbitration process when both local and downstream memory responses need to be returned upstream.

Figure 2:
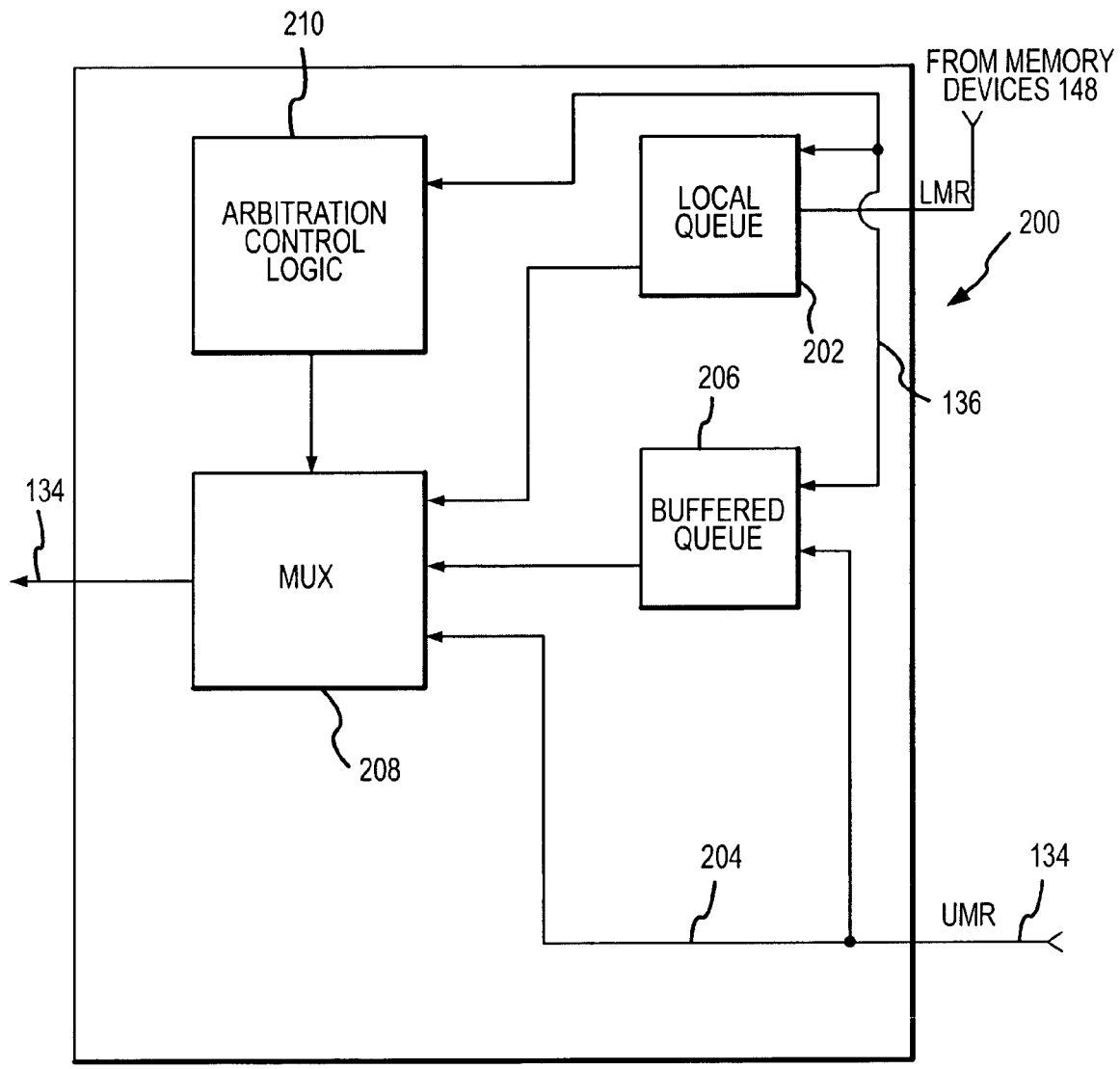
FIG. 2 is a functional block diagram illustrating an arbitration control component contained in each of the memory hubs of FIG. 1 according to one example of the present invention.

FIG. 2 is a functional block diagram illustrating an arbitration control component 200 contained in the memory hubs 140 of FIG. 1 according to one embodiment of the present invention. The arbitration control component 200 includes two queues for storing associated memory responses. A local queue 202 receives and stores local memory responses LMR from the memory devices 140 on the associated memory module 130. A buffered queue 206 receives and stores downstream memory responses which cannot be immediately forwarded upstream through a bypass path 204. A multiplexer 208 selects responses from one of the queues 202, 206 or the bypass path 204 under control of arbitration control logic 210 and supplies the memory responses in the selected queue upstream over the corresponding high-speed link 134. The arbitration control logic 210 is coupled to the queues 202, 206 through a control/status bus 136, which allows the logic 210 to monitor the contents of each of the queues 202, 206, and utilizes this information in controlling the multiplexer 208 to thereby control the overall arbitration process executed by the memory hub 140. The control/status bus 136 also allows "handshaking" signals to be coupled from the queues 202, 206 to the arbitration logic 210 to coordinate the transfer of control signals from the arbitration logic 210 to the queues 202, 206.

Figure 3:
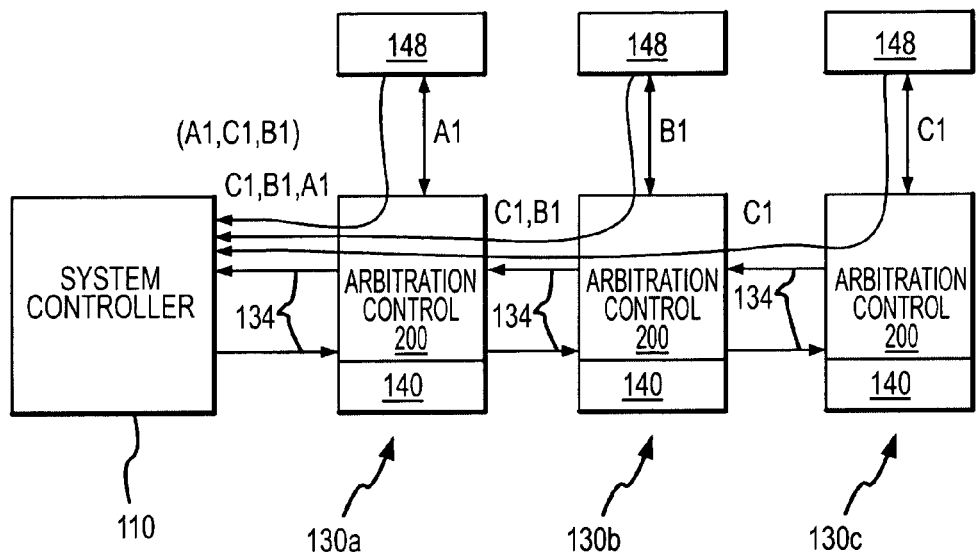
FIG. 3 is a functional flow diagram illustrating the flow of upstream memory responses in a process executed by the arbitration control component of FIG. 2 where downstream responses are give priority over local responses according to one embodiment of the present invention.

The specific operation of the arbitration control logic 210 in controlling the multiplexer 208 to provide responses from one of the queues 202, 206 or the bypass path 204 depends on the particular arbitration process being executed by the control logic. Several example arbitration processes that may be executed by the control logic 210 will now be described in more detail with reference to FIGS. 3 and 4. FIG. 3 is a functional flow diagram illustrating the flow of upstream memory responses in a process executed by the arbitration control component 200 of FIG. 2 where downstream responses are given priority over local responses according to one embodiment of the present invention. In the example of FIG. 3, the memory hub controller 132 applies a memory request to each of the memory modules 130a, 130b, and 130c. Each of the memory modules 130a–c provides a corresponding upstream response in response to the applied request, with the responses for the modules 130a, 130b, and 130c being designated A1, B1, and C1, respectively. The responses B1 and C1 are assumed to arrive at the local queue 202 and bypass path 204 in the hub 140 of the module 130b at approximately the same time. In this embodiment, the arbitration control logic 210 gives priority to downstream responses, and as a result the hub 140 in module 130b forwards upstream the downstream responses C1 first and thereafter forwards upstream the local response B1 as shown in FIG. 3.

If the response C1 arrives in the bypass path 204 in the hub 140 of the module 130a at approximately the same time as the local response A1 arrives in the local queue 202, the arbitration control logic 210 forwards upstream the downstream response C1 prior to the local response A1. Moreover, if the response B1 arrives in the bypass path 204 in the hub 140 of module 130a at approximately the same time as the downstream response C1, then arbitration control logic 210 forwards upstream the downstream response C1 followed by response B1 followed by local response A1, as shown in FIG. 3. The system controller 110 thus receives the responses C1, B1, and A1 in that order.

Because the arbitration control logic 210 in each memory hub 140 may execute an independent arbitration process, the arbitration control logic in the memory hub of the module 130a could give priority to local responses over downstream responses. In this situation, if the responses C1 and B1 arrive at the bypass path 204 in the hub 140 of the module 130a at approximately the same time as the local response A1 arrives in the local queue 202, the arbitration control logic 210 forwards upstream the local response A1 prior to the downstream responses C1 and B1. The memory hub controller 132 thus receives the responses A1, C1 and B1 in that order, as shown in parentheses in FIG. 3. Thus, by assigning different arbitration processes to different memory hubs 140 the latency of the corresponding memory modules 130 may be controlled. For example, in the first example of FIG. 3 where priority is given to downstream responses, the latency of the module 130a is higher than in the second example where in module 130a priority is given to local responses. In the second example, the memory hub controller 132 could utilize the module 130a to store frequently accessed data so that the system controller can more quickly access this data. Note that in the second example the responses C1, B1 would first be transferred to the buffered queue 206 since they could not be forwarded upstream immediately, and after response A1 is forwarded the responses C1, B1 would be forwarded from the buffered queue.

Figure 4:
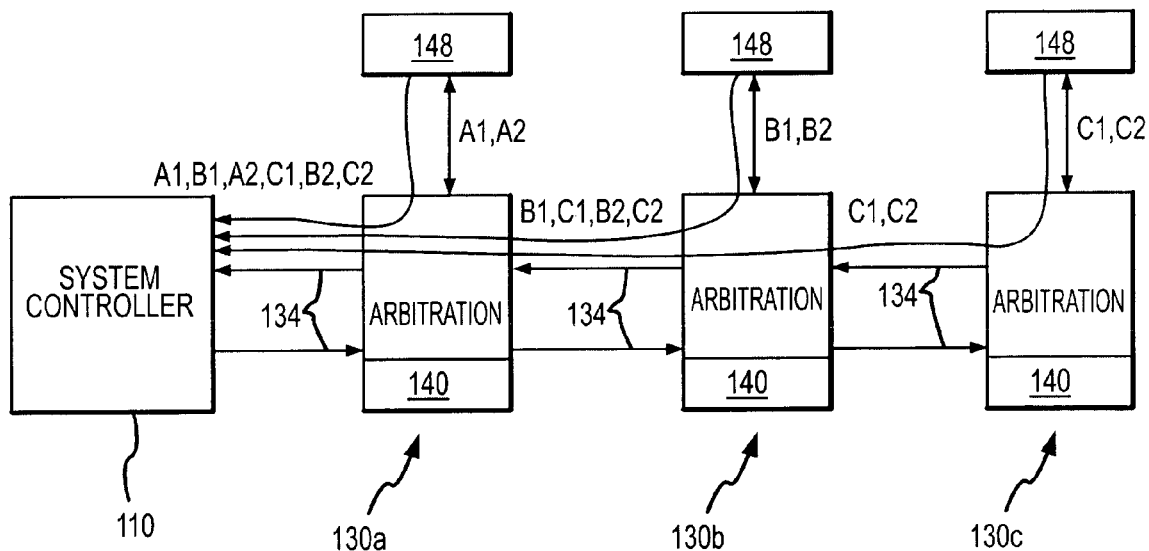
FIG. 4 is a functional flow diagram illustrating the flow of upstream memory responses in a process executed by the arbitration control component of FIG. 2 to provide equal bandwidth for local and downstream memory responses.

FIG. 4 is a functional flow diagram illustrating the flow of upstream memory responses in a process executed by the arbitration control component 200 of FIG. 2 to alternate between a predetermined number of responses from local and downstream memory. In the example of FIG. 4, the memory hub controller 132 applies two memory requests to each of the memory modules 130a, 130b, and 130c, with the requests applied to module 130a being designated A1, A2, requests applied to module 130b being designated B1, B2, and requests to module 130c being designated C1, C2. The responses C1 and C2 are assumed to arrive at the bypass path 204 in the hub 140 of the module 130b at approximately the same time as the local responses B1, B2 arrive at the local queue 202. The responses C1, C2 are transferred to the buffered queue 206 since they cannot be forwarded upstream immediately. The arbitration control logic 210 thereafter alternately forwards responses from the local queue 202 and the buffered queue 206. In the example of FIG. 4, the local response B1 from the local queue 202 is forwarded first, followed by the downstream response C1 from the buffered queue 206, then the local response B2 and finally the downstream response C2.

Now in the module 130a, the responses B1, C1, B2, C2 are assumed to arrive at the bypass path 204 in the hub 140 at approximately the same time as the local responses A1, A2 arrive at the local queue 202. The responses B1, C1, B2, C2 are transferred to the buffered queue 206 since they cannot be forwarded upstream immediately. The arbitration control logic 210 thereafter operates in the same way to alternately forward responses from the local queue 202 and the buffered queue 206. The local response A1 from the local queue 202 is forwarded first, followed by the downstream response B1 from the buffered queue 206, then the local response A2 followed by downstream response C1. At this point, the local queue 202 is empty while the buffered queue 206 still contains the responses B2, C2. No conflict between local and downstream responses exists, and the arbitration control logic 200 accordingly forwards upstream the remaining responses B2, C2 to empty the buffered queue 206.

In the arbitration process illustrated by FIG. 4, the arbitration control logic 210 forwarded a predetermined number of either local or downstream responses prior to forwarding the other type of response. For example, in the process just described the arbitration control logic 210 forwards one local response and then one downstream response. Alternatively, the arbitration control logic 210 could forward two local responses followed by two downstream responses, or three local responses followed by three downstream responses, and so on. Furthermore, the arbitration control logic 210 could forward N local responses followed by M downstream responses, where N and M may be selected to give either local or downstream responses priority.

In another embodiment, the arbitration control logic 210 of FIG. 2 executes an oldest first algorithm in arbitrating between local and downstream memory responses. In this embodiment, each memory response includes a response identifier portion and a data payload portion. The response identifier portion identifies a particular memory response and enables the arbitration control logic 210 to determine the age of a particular memory response. The data payload portion includes data being forwarded upstream to the memory hub controller 132, such as read data. In operation, the arbitration control logic 210 monitors the response identifier portions of the memory responses stored in the local queue 202 and the buffered queue 206 and selects the oldest response contained in either of these queues as the next response to be forwarded upstream. Thus, independent of queue 202, 206 in which a memory response is stored, the arbitration control logic 210 forwards the oldest responses first.

In determining the oldest response, the arbitration control logic 210 utilizes the response identifier portion of the memory response and a time stamp assigned to the memory request corresponding to the response. More specifically, the memory hub controller 132 generates a memory request identifier for each memory request. As the memory request passes through each memory hub 140, the arbitration control logic 210 of each hub assigns a time stamp to each request, with the time stamp indicating when the request passed through the memory hub 140. Thus, each hub 140 essentially creates a table of request identifiers and associated time stamps. Thus, the control logic 210 in each hub 140 stores a table of a unique memory request identifier and a corresponding time stamp for each memory request passing through the hub.

In each memory response, the response identifier portion corresponds to the memory request identifier, and thus the response for a given request is identified by the same identifier. The arbitration control logic 210 thus identifies each memory response stored in the local queue 202 and buffered queue 206 by the corresponding response identifier portion. The control logic 210 then compares the response identifier portion of each response in the queues 202, 206 to the table of request identifiers, and identifies the time stamp of the response identifier as the time stamp associated with the corresponding request identifier in the table. The control logic 210 does this for each response, and then forwards upstream the oldest response as indicated by the corresponding time stamp. The arbitration control logic 210 repeats this process to determine the next oldest response and then forwards that response upstream, and so on.

In the preceding description, certain details were set forth to provide a sufficient understanding of the present invention. One skilled in the art will appreciate, however, that the invention may be practiced without these particular details. Furthermore, one skilled in the art will appreciate that the example embodiments described above do not limit the scope of the present invention, and will also understand that various equivalent embodiments or combinations of the disclosed example embodiments are within the scope of the present invention. Illustrative examples set forth above are intended only to further illustrate certain details of the various embodiments, and should not be interpreted as limiting the scope of the present invention. Also, in the description above the operation of well known components has not been shown or described in detail to avoid unnecessarily obscuring the present invention. Finally, the invention is to be limited only by the appended claims, and is not limited to the described examples or embodiments of the invention.

The invention claimed is:

1. A memory hub, comprising:
  a local queue adapted to receive local memory responses, and operable to store the local memory responses;
  a bypass path adapted to receive downstream memory responses, and operable to pass the downstream memory responses;
  a buffered queue coupled to the bypass path and operable to store downstream memory responses;
  a multiplexer coupled to the local queue, buffered queue and bypass path, the multiplexer being operable to output responses from a selected one of the queues or the bypass path responsive to a control signal; and
  arbitration control logic coupled to the multiplexer, the arbitration logic operable to develop the control signal to control the selection of responses output by the multiplexer to alternately output a number of memory responses stored in the buffered queue and the same number of memory responses stored in the local queue if the number or a greater number of responses are stored in each queue.

2. The memory hub of claim 1 wherein the arbitration control logic develops the control signal to output memory responses stored in the local queue prior to memory responses stored in the buffered queue.

3. The memory hub of claim 1 wherein the arbitration control logic develops the control signal to output memory responses stored in the buffered queue prior to memory responses stored in the local queue.

4. The memory hub of claim 1 wherein the arbitration control logic assigns a time stamp to each memory request received by the hub.

5. The memory hub of claim 1 wherein each of the local and downstream memory responses comprise data and a header identifying a memory request corresponding to the memory response.

6. A memory hub adapted to receive local memory responses and downstream memory responses, the memory hub operable to store the received memory responses and operable to assign a time stamp to each memory request when the request is received by the memory hub and further operable to apply an arbitration algorithm to provide memory responses from local and buffered queues on an uplink output as a function of the age of a memory request associated with each memory response, the age of each request corresponding to the respective assigned time stamp.

7. The memory hub of claim 6 wherein the memory hub includes the local queue that stores the local memory responses and the buffered queue that stores the downstream memory responses.

8. The memory hub of claim 7 wherein the memory hub further comprises a multiplexer coupled to the local queue, buffered queue, and bypass path, the multiplexer providing responses from one of the queues or bypass path on an output responsive to a control signal.

9. The memory hub of claim 8 wherein the memory hub further comprises arbitration logic coupled to the queues and the multiplexer, and wherein the arbitration logic applies the control signal to the multiplexer to control which memory responses are provided on the output.

10. The memory hub of claim 9 further including a bypass path coupled to the buffered queue and coupled to the multiplexer, the bypass path adapted to receive the downstream memory responses and operable to provide the responses to the multiplexer and the buffered queue.

11. The memory hub of claim 6 wherein each of the local and downstream memory responses comprise data and a header identifying a memory request corresponding to the memory response.

12. A memory module, comprising:
a plurality of memory devices; and
a memory hub coupled to the memory devices, the memory hub including,
  a local queue adapted to receive local memory responses, and operable to store the local memory responses;
  a bypass path adapted to receive downstream memory responses, and operable to pass the downstream memory responses;
  a buffered queue coupled to the bypass path and operable to store downstream memory responses;
  a multiplexer coupled to the local queue, buffered queue and bypass path, and operable to output responses from one of the queues or the bypass path responsive to a control signal; and
  arbitration control logic coupled to the multiplexer, the arbitration logic operable to develop the control signal to control the selection of responses output by the multiplexer to alternately output a number of memory responses stored in the buffered queue and the same number of memory responses stored in the local queue if the number or a greater number of responses are stored in each queue.

13. The memory module of claim 12 wherein each of the memory devices comprises a synchronous dynamic random access memory.

14. The memory module of claim 13 wherein the arbitration control logic develops the control signal to output memory responses stored in the local queue prior to memory responses stored in the buffered queue.

15. The memory module of claim 13 wherein the arbitration control logic develops the control signal to output memory responses stored in the buffered queue prior to memory responses stored in the local queue.

16. The memory module of claim 12 wherein the arbitration control logic assigns a time stamp to each memory request when the request is received by the hub.

17. The memory module of claim 12 wherein each of the local and downstream memory responses comprise data and a header identifying a memory request corresponding to the memory response.

18. A memory system, comprising:
a memory hub controller;
a plurality of memory modules, each memory module being coupled to adjacent memory modules through respective high-speed links, at least one of the memory modules being coupled to the memory hub controller through a respective high-speed link, and each memory module comprising:
  a plurality of memory devices; and
  a memory hub coupled to the memory devices, the memory hub comprising,
    a local queue adapted to receive local memory responses, and operable to store the local memory responses;
    a bypass path adapted to receive downstream memory responses, and operable to pass the downstream memory responses;
    a buffered queue coupled to the bypass path and operable to store downstream memory responses;
    a multiplexer coupled to the local queue, the buffered queue and the bypass path, and operable to output responses from one of the queues or the bypass path responsive to a control signal; and
    arbitration control logic coupled to the multiplexer, the arbitration logic operable to develop the control signal to control the selection of responses output by the multiplexer to alternately output a number of memory responses stored in the buffered queue and the same number of memory responses stored in the local queue if the number or a greater number of responses are stored in each queue.

19. The memory system of claim 18 wherein each of the high-speed links comprises an optical communications link.

20. The memory system of claim 18 wherein at least some of the memory devices comprise synchronous dynamic random access memories.

21. The memory system of claim 18 wherein the arbitration control logic develops the control signal to output memory responses stored in the local queue prior to memory responses stored in the buffered queue.

22. The memory system of claim 18 wherein the arbitration control logic develops the control signal to output memory responses stored in the buffered queue prior to memory responses stored in the local queue.

23. The memory system of claim 18 wherein the arbitration control logic assigns a time stamp to each memory request received by the hub.

24. The memory system of claim 18 wherein each of the local and downstream memory responses comprise data and a header identifying a memory request corresponding to the memory response.

25. A computer system, comprising:
a processor;
a system controller coupled to the processor, the system controller including a memory hub controller;
an input device coupled to the processor through the system controller;
an output device coupled to the processor through the system controller;
a storage device coupled to the processor through the system controller;
a plurality of memory modules, each memory module being coupled to adjacent memory modules through respective high-speed links, at least one of the memory modules being coupled to the memory hub controller through a respective high-speed link, and each memory module comprising:
  a plurality of memory devices; and
  a memory hub coupled to the memory devices and coupled to the corresponding high-speed links, the memory hub including,
    a local queue adapted to receive local memory responses, and operable to store the local memory responses;
    a bypass path adapted to receive downstream memory responses, and operable to pass the downstream memory responses;
    a buffered queue coupled to the bypass path and operable to store downstream memory responses;
    a multiplexer coupled to the local queue, the buffered queue and the bypass path, and operable to output responses from a selected one of the queues or the bypass path responsive to a control signal; and
    arbitration control logic coupled to the multiplexer, the arbitration logic operable to develop the control signal to control the selection of responses output by the multiplexer to alternately output a number of memory responses stored in the buffered queue and the same number of memory responses stored in the local queue if the number or a greater number of responses are stored in each queue.

26. The computer system of claim 25 wherein each of the high-speed links comprises an optical communications link.

27. The computer system of claim 25 wherein at least some of the memory devices comprise synchronous dynamic random access memories.

28. The computer system of claim 25 wherein the processor comprises a central processing unit (CPU).

29. The computer system of claim 25 wherein each of the local and downstream memory responses comprise data and a header identifying a memory request corresponding to the memory response.

* * * * *